Sept. 29, 1970 E. LANGER 3,531,741

N-PATH FILTER

Filed July 3, 1968

INVENTOR
ERIK LANGER

BY Hill, Sherman, Meroni, Gross & Simpson
ATTORNEYS

United States Patent Office 3,531,741
Patented Sept. 29, 1970

3,531,741
N-PATH FILTER
Erik Langer, Munich, Germany, assignor to Siemens Aktiengesellschaft, Erlangen, Germany, a corporation of Germany
Filed July 3, 1968, Ser. No. 742,335
Claims priority, application Germany, July 4, 1967, 1,541,978
Int. Cl. H03h *7/10, 7/28*
U.S. Cl. 333—70 8 Claims

ABSTRACT OF THE DISCLOSURE

An N-path filter utilizing parallel switching, in which at least two RC-low-pass networks are connected in a cascade circuit, and coupled in a feedback circuit, including an amplifier, in which the amplifier and feedback circuit are so constructed that improved relation of band width and selection properties is achieved.

BACKGROUND OF THE INVENTION

The present invention is directed to an N-path filter employing parallel switching. Filters of this type are known and described, for example, in the article "Time Multiplex Processes for Filter Synthesis" which appeared in the periodical "Frequenz," vol. 20 (1966), No. 12, pages 397 to 406.

In principle, the operation of such filters is based upon the fact that through the desired selection, the low pass characteristic of RC low passes is converted in the parallel paths of the filter into a band pass characteristic in which the selected frequency represents the middle frequency of the band.

Such filters employing parallel switching are, of course, relatively simple to construct, but they have the disadvantage of a relatively restricted selection, since the transmission curve corresponds to only that of a simple LC-oscillatory circuit. The simple real pole point is thereby transformed into a single conjugate complex pole-point pair. For this transformation the following known relation applies:

$$G(s)=\frac{1}{a_0+a_1 s}-G(s\pm j\omega_0)=\frac{1}{a_0+a_1(s\pm j\omega_0}$$

in which:

$G(s)$=The transformation function of the low pass
$G(s\pm j\omega_0)$=The transformed transmission function
$a_0$, $a_1$=Constants
s=The complex frequency
$\omega_0$=Band middle frequency of the band pass characteristic derived from the transformed low pass characteristic.

Likewise, N-path filters are known which are constructed with series switching, and while it is, of course, possible to achieve a better selection, filters with series switching have numerous drawbacks as compared to filters with parallel switching. First, the expenditure for filters with series switching is high as two switches per path are required and furthermore the switch terminals in such cases will lie on a floating potential. Consequently, not only is it necessary to utilize a large number of switches but a greater expenditure per switch is required. It will also be appreciated that in a filter with series switching both the switches and the low passes involved must be ideally designed in a mathematical sense, if no interference frequencies are to occur at the output of the filter. Obviously this requirement for a "mathematically ideal construction" can at best be only approximately satisfied in actual practice. The problem of the present invention thus is to produce an N-path filter of the type initially mentioned with improved relation of band width and selection properties.

BRIEF SUMMARY OF INVENTION

The solution to such problem is achieved, according to the invention, by an arrangement in which at least two scanned RC low-pass networks are coupled in a cascade circuit with such RC low-pass networks being provided with a feedback circuit which includes an amplifier, in which such circuit and amplifier are so constructed that the amplification and feedback dimensions satisfies the following equation:

$$\left(\frac{T_1+T_2}{2N\cdot T_1\cdot T_2}\right)^2<\frac{v\cdot R_1}{(R_1+R_3)N^2\cdot T_1\cdot T_2}\cdot\frac{\sin^4(\pi/N)}{(\pi/N)^4}$$

Here, the following significations hold, in which:

$$T_1=R_{12}C_{1m}$$

$$T_2=R_{21}C_{2n}$$

$R_1$=Source resistance at the input of the N-path filter
$R_{12}$=Ohmic compoment of the first low-pass network in the cascade circuit
N=Number of low-pass network paths
$v$=Voltage amplification of the amplifier
$C_{1m}$=$m$-th capacity of the first low-pass network in the cascade circuit
$C_{2n}$=$n$-th capacity of the second low-pass network in the cascade circuit
n=1,2 . . . N
$m$=1,2 . . . N.

In accordance with the invention, the RC low-pass networks can be coupled either directly or over an isolating amplifier. The utilization of a coupling employing an isolating amplifier offers the addtional advantage of effecting a decoupling of the low-pass networks and an improvement in the signal-to-noise ratio as a result of at least partial compensation of the attenuation of the low-pass network.

BRIEF DESCRIPTION OF DRAWINGS

In the drawings wherein like reference characters indicate like or corresponding parts.

DETAILED DESCRIPTION

Figure 1:
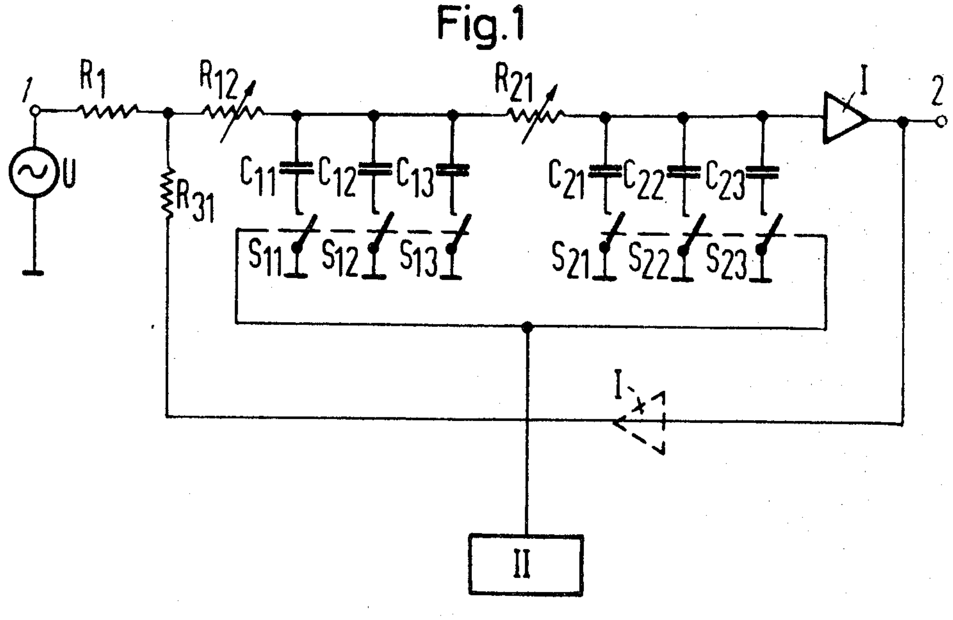
FIG. 1 illustrates a filter circuit embodying the present invention.

The N-path filter illustrated in FIG. 1 contains two RC-low-pass networks connected in cascade, one containing resistance $R_{12}$, capacitors $C_{11}$, $C_{12}$, $C_{13}$, and switches $S_{11}$, $S_{12}$ and $S_{13}$ while the other network comprises resistance $R_{21}$ capacitances $C_{21}$, $C_{22}$, $C_{23}$, and switches $S_{21}$, $S_{22}$ and $S_{23}$. The two low-pass networks may be controlled by a scanning generator II operatively connected therewith. The means for controlling the switches $S_{11}$ to $S_{13}$, and $S_{21}$ to $S_{23}$ is merely schematically represented in the figure and in practice such switches can, for example, employ diodes or transistors.

A feedback circuit bridges the filter and includes an amplifier I and a resistance $R_{31}$. The amplifier I can be inserted in the circuit either as illustrated in solid lines as illustrated in FIG. 1 whereby the filter output is also amplified thereby, or the amplifier may be inserted solely in the feedback circuit as indicated in broken lines.

The input signal from the source U is supplied to the input terminal 1 of the filter, over an input resistance $R_1$ with the output signal appearing at the terminal 2. By suitable dimensioning, in accordance with the invention, of the low pass networks of the cascade circuit as well as of the amplifier and feedback circuits, in accordance with the equation previously set forth under the heading Brief Summary of Invention, there can be attained a band pass with at least two complex pole point pairs.

In order to achieve a variable band width in the filter illustrated in FIG. 1, either the amplification of amplifier I or the time constant of the low-pass networks can be varied. Obviously, the amplifier can readily be provided with a variable control in accordance with known techniques and where it is desired to vary the time constant, this can be readily accomplished by constructing the resistances $R_{12}$ and $R_{21}$ as varaible resistors, as indicated in FIG. 1.

Figure 2:
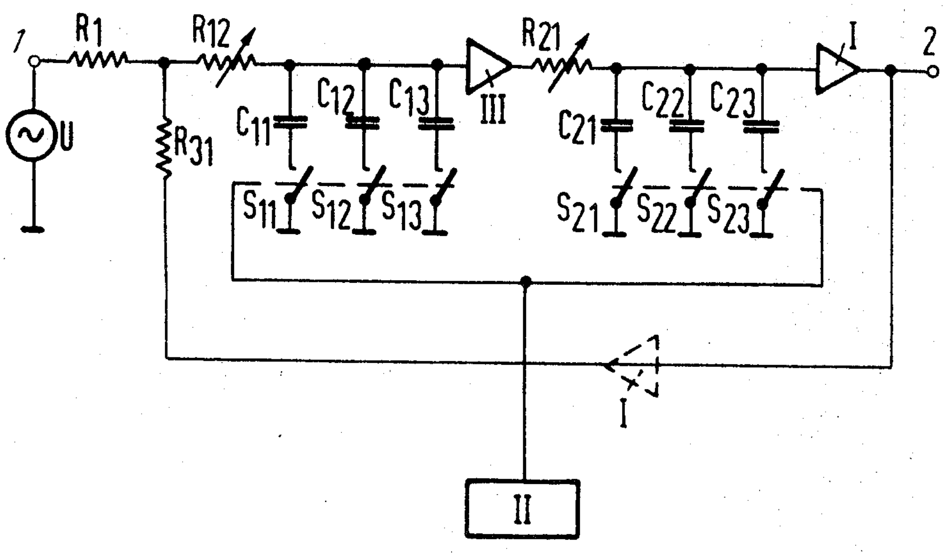
FIG. 2 is a similar circuit illustrating a further embodiment of the invention.

FIG. 2 illustrates a circuit incorporating the components of FIG. 1 but which includes an additional amplifier III which is disposed between the respective networks and thus functions as an isolating ampifier with the attendant advantages previously referred to.

It will be appreciated that the construction of a filter in accordance with the present invention is such that known techniques may be utilized in its fabrication to produce a filter which, at least in part, is in the form of an integrated circuit.

Although various minor modifications might be made or suggested by those versed in the art, it should be understood that I wish to employ within the scope of the patent granted hereon, all such embodiments as reasonably and properly come within the scope of my contribution to the art.

I claim as my invention:

1. An N-path filter utilizing parallel switching, comprising at least two selected RC low-pass networks connected in a cascade circuit, a feedback circuit bridging said networks of the cascade circuit, and an amplifier disposed in the feedback path, said amplifier and feedback circuit being so constructed that the resulting amplification and feedback are respectively so dimensioned that the following equation is satisfied:

$$\left(\frac{T_1+T_2}{2N\cdot T_1\cdot T_2}\right)^2<\frac{v\cdot R_1}{(R_1+R_{31}N^2\cdot T_1\cdot T_2}\cdot\frac{\sin^4\left(\frac{\pi}{N}\right)}{\left(\frac{\pi}{N}\right)^4}$$

in which:

$T_1=R_{12}C_{1m}$
$T_2=R_{21}C_{2n}$
$R_1$=source resistance at the input of the N-path filter
$R_{12}$=ohmic component of the first low-pass network in the cascade circuit
N=number of low-pass network paths
$R_{31}$=a resistance disposed in said feedback path
$v$=voltage amplification of the amplifier
$C_{1m}$=$m$-th capacity of the first low-pass network in the cascade circuit
$C_{2n}$=$n$-th capacity of the second low-pass network in the cascade circuit
$n=1,2\ldots N$
$m=1,2\ldots N$.

2. An N-path filter according to claim 1, wherein the RC low-pass networks are directly connected in cascade.

3. An N-path filter according to claim 1, comprising in further combination, an isolating amplifier disposed between and operatively coupling said low-pass networks.

4. An N-path filter according to claim 1, where the amplifier is so constructed that the amplification in the feedback circuit may be selectively varied.

5. An N-path filter according to claim 1, wherein said low-pass networks are so constructed that their time constants may be varied.

6. An N-path filter according to claim 1, wherein at least a part of the components thereof are constructed as an integrated circuit.

7. An N-path filter according to claim 1, wherein the output of said amplifier forms the output of the filter, with the output signal thus being amplified thereby.

8. An N-path filter according to claim 1, wherein the filter output is disposed ahead of the amplifier.

References Cited

"An Alternative Approach to the Realization of Network Transfer Functions: The N-Path Filter," Franks and Sandberg in The Bell System Technical Journal, vol. XXXIX, No. 5, September 1960; pp. 1321–1350.

HERMAN KARL SAALBACH, Primary Examiner
M. NUSSBAUM, Assistant Examiner